(12) United States Patent
Suzuki et al.

(10) Patent No.: US 11,318,720 B2
(45) Date of Patent: May 3, 2022

(54) READILY PEELABLE ABSORPTION FILM

(71) Applicant: Kyodo Printing Co., Ltd., Tokyo (JP)

(72) Inventors: Kenta Suzuki, Tokyo (JP); Yoshiyuki Atsuchi, Tokyo (JP); Saori Kimura, Tokyo (JP); Yuki Narita, Tokyo (JP)

(73) Assignee: KYODO PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/046,136

(22) PCT Filed: Apr. 9, 2019

(86) PCT No.: PCT/JP2019/015475
§ 371 (c)(1),
(2) Date: Oct. 8, 2020

(87) PCT Pub. No.: WO2019/203063
PCT Pub. Date: Oct. 24, 2019

(65) Prior Publication Data
US 2021/0031500 A1  Feb. 4, 2021

(30) Foreign Application Priority Data

Apr. 16, 2018 (JP) .............................. JP2018-078703

(51) Int. Cl.
*B32B 27/08* (2006.01)
*B01J 20/16* (2006.01)
(Continued)

(52) U.S. Cl.
CPC .............. *B32B 27/08* (2013.01); *B01J 20/165* (2013.01); *B32B 27/18* (2013.01); *B32B 27/308* (2013.01);
(Continued)

(58) Field of Classification Search
CPC ............ B32B 2250/02; B32B 2250/03; B32B 2264/1021; B32B 2264/1023;
(Continued)

(56) References Cited

U.S. PATENT DOCUMENTS

2015/0375477 A1  12/2015  Suzuki et al.
2016/0220979 A1   8/2016  Terada et al.

FOREIGN PATENT DOCUMENTS

CN   101733987   6/2010
CN   102971144   3/2013
(Continued)

OTHER PUBLICATIONS

International Search Report issued in International Patent Application No. PCT/JP2019/015475, dated Jun. 25, 2019 and English translation.
(Continued)

*Primary Examiner* — Yan Lan
(74) *Attorney, Agent, or Firm* — Greenblum & Bernstein, P.L.C.

(57) ABSTRACT

This easily peelable absorption film is provided with an absorption film that contains a thermoplastic resin and an absorbing agent, and an easy-peel layer that is layered directly on one surface of the absorption film, wherein: the absorbing agent content is 20 mass % or more with reference to the mass of the entire absorption film; and when the easy-peel layer of the easily peelable absorption film is heat-sealed to another resin and the easily peelable absorption film is peeled from the other resin, the easy-peel layer agglomerates and peels away.

9 Claims, 4 Drawing Sheets

(51) Int. Cl.
*B32B 27/18* (2006.01)
*B32B 27/30* (2006.01)
*B32B 27/32* (2006.01)

(52) U.S. Cl.
CPC .......... *B32B 27/32* (2013.01); *B32B 2250/02* (2013.01); *B32B 2250/03* (2013.01); *B32B 2264/1021* (2020.08); *B32B 2264/1023* (2020.08); *B32B 2307/50* (2013.01); *B32B 2307/7265* (2013.01); *B32B 2307/748* (2013.01); *B32B 2323/04* (2013.01); *B32B 2333/00* (2013.01); *B32B 2439/46* (2013.01); *B32B 2439/70* (2013.01); *B32B 2439/80* (2013.01)

(58) Field of Classification Search
CPC ........ B32B 2307/50; B32B 2307/7265; B32B 2307/748; B32B 2323/04; B32B 2333/00; B32B 2439/46; B32B 2439/70; B32B 2439/80; B32B 27/08; B32B 27/18; B32B 27/308; B32B 27/32; B65D 65/40; B01J 20/165
See application file for complete search history.

(56) References Cited

FOREIGN PATENT DOCUMENTS

| | | |
|---|---|---|
| CN | 105555531 | 5/2016 |
| JP | 2009-78520 | 4/2009 |
| JP | 2014-91547 A | 5/2014 |
| WO | 2016/013595 A1 | 1/2016 |

OTHER PUBLICATIONS

Written Opinion issued in International Patent Application No. PCT/JP2019/015475, dated Jun. 25, 2019 and English translation.
Japan Official Action issued in JP Application No. 2018-078703, dated Aug. 31, 2021 and English language translation thereof.

READILY PEELABLE ABSORPTION FILM

FIELD

The present invention relates to an easy (readily) peelable absorption film.

BACKGROUND

Conventionally, in the fields of food, medicine, electronic components, precision machines, recording materials, and the like, an absorbing agent such as a moisture absorbing agent has been enclosed for the purpose of preventing quality deterioration caused by moisture. In addition, in order to provide an absorbing function to the packaging member itself without putting a separate absorbing agent into the packaging, the absorbing agent is contained in the packaging member itself.

In recent years, in the field of packaging members, there has been a growing need for easy-openable properties which enable the packaging members to be easily open. In order to provide easy opening, for example, an easy peel film has been adhered onto the surface of the component of the packaging member.

PTL 1 discloses a laminated film for an easy-openable package comprising a sealant layer having easy-peel properties and a moisture absorption layer provided on one surface of the sealant layer.

CITATION LIST

Patent Literature

[PTL 1] JP 2014-091547 A

SUMMARY

Technical Problem

As a method for changing the properties of the laminated film of PTL 1, it is conceivable to change the resin to be kneaded with an absorbing agent for the purpose of enhancing the dispersibility of an absorbing agent such as a moisture absorbing agent, or to increase the content of the absorbing agent for the purpose of improving the absorbency. However, the present inventors have found that, when such means are employed, stable easy-pealability would not be realized.

Therefore, there is a need to provide an easily peelable absorption film which has stable easy-pealability while maintaining an absorption amount by an absorbing agent.

Solution to Problem

As a result of intensive investigations, the present inventors have discovered that the above-described problems can be solved by the following means and have accomplished the present invention. More specifically, the present invention is as follows:

<Aspect 1> An easily peelable absorption film, comprising an absorption layer containing a thermoplastic resin and an absorbing agent, and an easy peel layer laminated directly to one side of the absorption layer,
wherein the content of the absorbing agent is 20 mass % or more based on the mass of the entire absorption layer, and
wherein, when the easy peel layer side of the easily peelable absorption film is heat-sealed to other resin member and then the easily peelable absorption film is peeled from the other resin member, then the easy peel layer is cohesively peeled off.

<Aspect 2> The easily peelable absorption film according to aspect 1, wherein the tensile fracture strength according to JIS K 7127:1999 of the absorption layer is greater than that of the easy peel layer.

<Aspect 3> The easily peelable absorption film according to aspect 1 or 2, wherein the thermoplastic resin in the absorption layer is an ethylene-(meth)acrylic acid copolymer.

<Aspect 4> The easily peelable absorption film according to any one of aspects 1 to 3, wherein said absorbing agent is a moisture absorbing agent.

<Aspect 5> The easily peelable absorption film according to aspect 4, wherein the moisture absorbing agent is a zeolite.

<Aspect 6> The easily peelable absorption film according to any one of aspects 1 to 5, further comprising a skin layer on a surface of the absorption layer opposite to the easy peel layer.

<Aspect 7> A packaging laminate comprising, an easily peelable absorption film according to any one of the aspects 1 to 6, and a substrate layer laminated on a surface of the easily peelable absorption film opposite to the easy peel layer.

<Aspect 8> A packaging bag, wherein the packaging bag comprises one or more packaging laminate according to the aspect 7, and
wherein a portion of the easy peel layer side of the one or more packaging laminate is heat-sealed with other portions of the packaging laminate or a film other than the packaging laminate so as to form a bag shape.

<Aspect 9> A packaging bag with contents, comprising a content, and
the packaging bag according to aspect 8, containing said contents.

Advantageous Effects of Invention

According to the present invention, it is possible to provide an easily peelable absorption film having stable easy peelability while maintaining an absorption amount by an absorbing agent.

DESCRIPTION OF EMBODIMENTS

<<Easily Peelable Absorption Film>>

Figure 1:
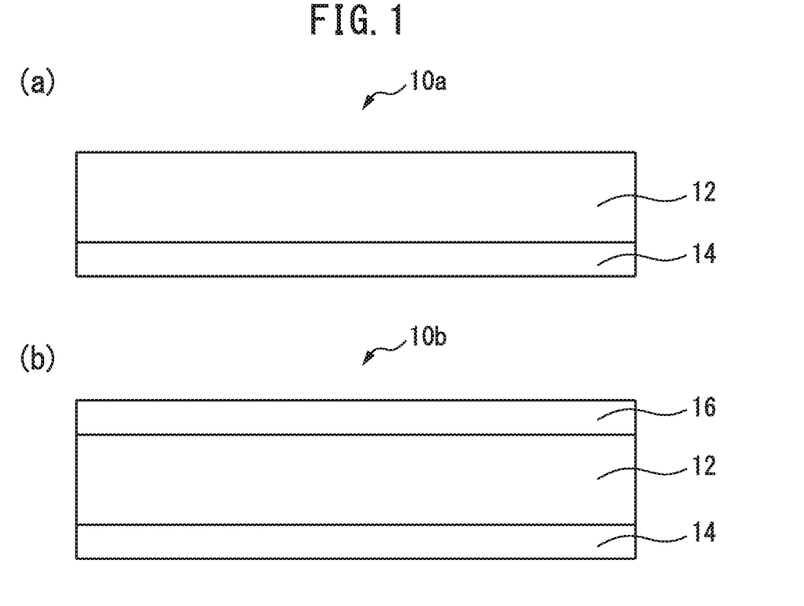
FIG. 1 is a schematic cross-sectional view of the easily peelable absorption film of the present invention.

As shown in FIG. 1 (*a*), the easily peelable absorption film 10*a* of the present invention comprises an absorption layer 12 containing a thermoplastic resin and an absorbing agent, and an easy peel layer 14 laminated directly to one side of the absorption layer 12, wherein the content of the absorbing agent is 20 mass % or more based on the mass of the entire absorption layer 12 and wherein, when the easy peel-layer 14 side of the easily peelable absorption film 10a is heat-sealed to other resin member and then the easily peelable absorption film 10a is peeled from the other resin member, then the easy peel layer 14 is cohesively peeled off.

In one aspect, as shown in FIG. 1(b), the easily peelable absorption film 10b of the present invention may further comprise a skin layer 16 on a surface of the absorption layer 12 opposite to the easy peel layer 14.

"Cohesive peeling" in the present invention is described with reference to FIG. 3. As shown in FIG. 3(a), the term means that, when the packaging laminate 100b, in which the substrate layer 20 is laminated on the easily peelable absorption film 10b, is heat-sealed on the other resin member 30 and then the packaging laminate 100b is peeled off from the other resin member, the easy peel layer 14 is partially broken as shown in FIG. 3(b), and as shown in FIG. 3(c), the broken part of the easy peel layer 14 does not reach the interface between the absorption layer 12 and the easy peel layer 14, and a part of the easy peel layer 14 is divided in a shape remaining on the other resin member 30.

The present inventors have found that, when the content of the absorbing agent is increased, in particular, when the content is set to 20 mass % or more based on the mass of the entire absorption layer, a stable easy peelability cannot be realized because the strength of the absorption layer and the delamination strength are reduced.

Figure 4:
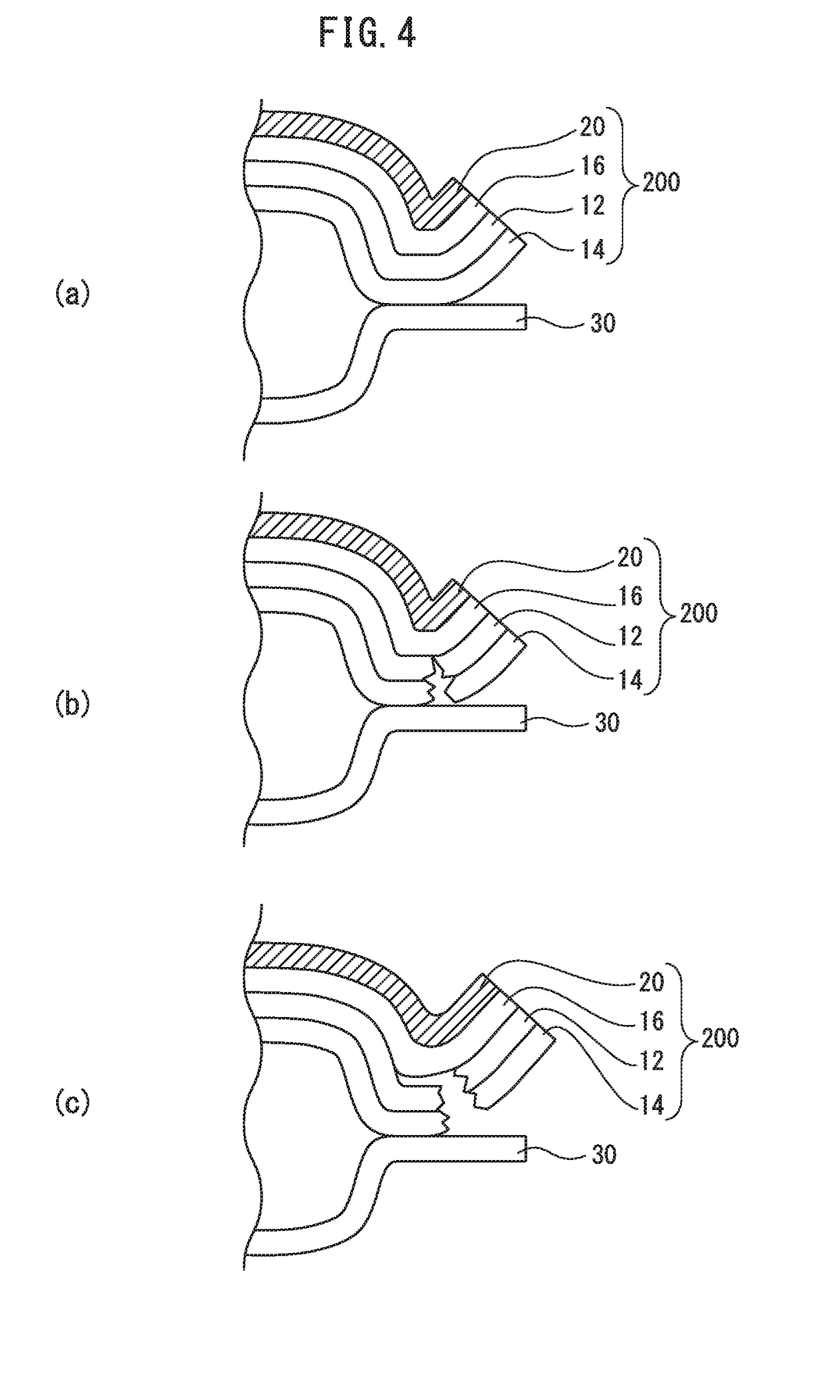
FIG. 4 is a conceptual view of a breaking mechanism of a conventional packaging laminate in which breakage of an absorption layer may occur.

More specifically, the larger the content of the absorbing agent in the absorption layer, the more easily the absorption layer is broken. As a result, when the conventional packaging laminate 200 shown in FIG. 4(a), which comprises the absorption layer 12 having a high content of the absorbing agent and the substrate layer 20, is adhered to another film 30, and then is attempted to be peeled off, not only the easy peel layer 14 but also the absorption layer 12 is broken as shown in FIG. 4(b), and as a result, delamination occurs between the absorption layer 12 and the skin layer 16 as shown in FIG. 4(c), and adequate peeling may be prevented.

Figure 5:
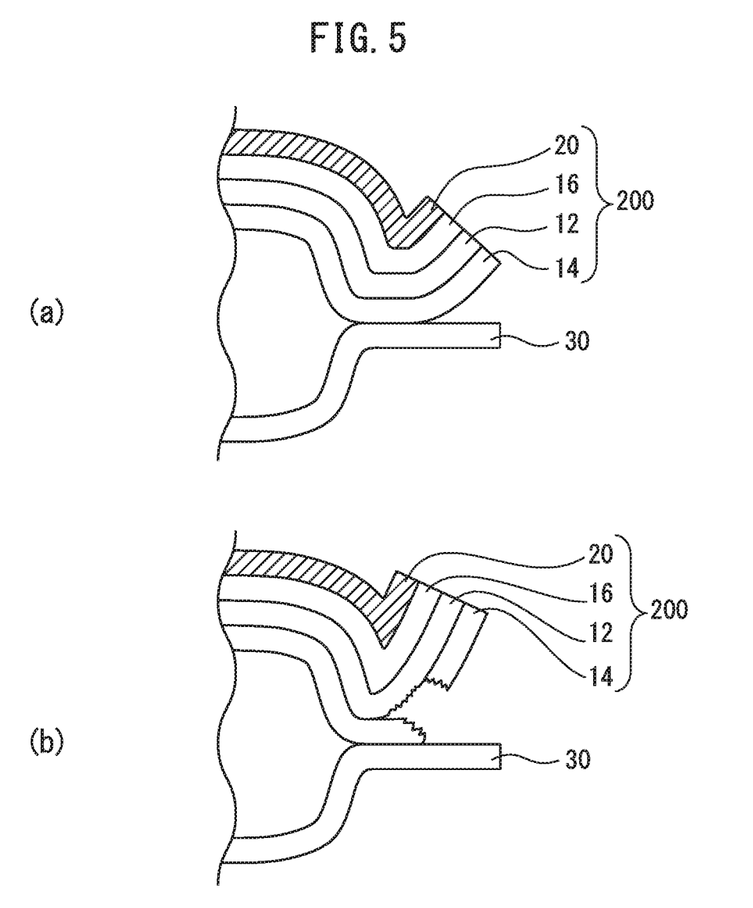
FIG. 5 is a conceptual view of a breaking mechanism of a conventional packaging laminate in which delamination between an absorption layer and an easy peel layer may occur.

In addition, when the content of the absorbing agent of the absorption layer is increased, then the absorbing agent appears on the surface of the absorption layer, and the adhesion to the easy peel layer becomes weak at that portion, and as a result, the interlayer strength between the absorption layer and the easy peel layer tends to be low. As a result, when the conventional packaging laminate 200 shown in FIG. 5(a), which comprises the absorption layer 12 having a high content of the absorbing agent and the substrate layer 20, is adhered to another film 30, and then is attempted to be peeled off, then, as shown in FIG. 5(b), delamination occurs between the absorption layer 12 and the easy peel layer 14, and adequate peeling may be prevented.

Figure 3:
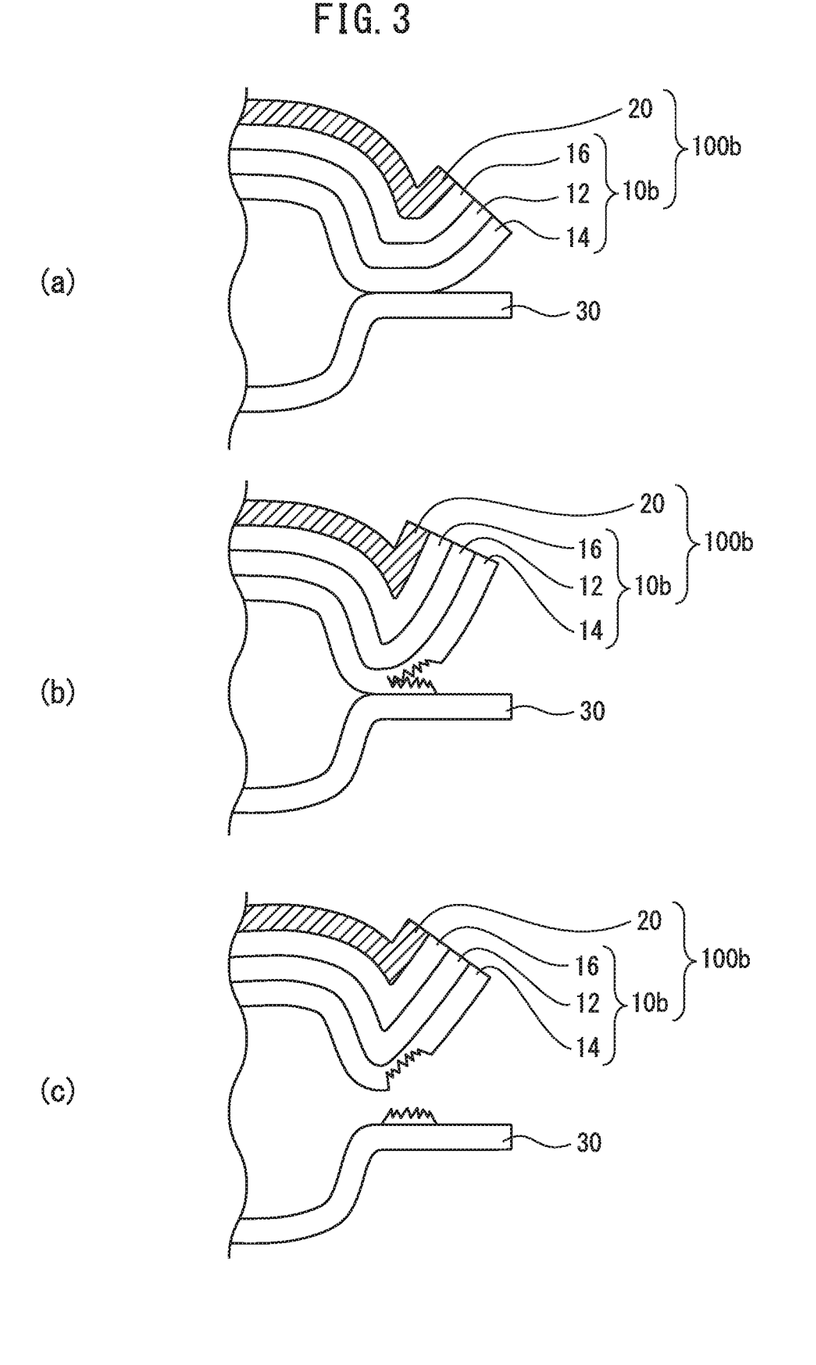
FIG. 3 is a conceptual view of a breaking mechanism of the packaging laminate of the present invention.

On the other hand, the present inventors have found that the peeling mechanism shown in FIG. 3 can be realized by obtaining an easily peelable absorption film which enables cohesive peeling of the easy peel layer when the easy peel layer side of the easily peelable absorption film is heat sealed to other resin member and then the easily peelable absorption film is peeled off from the other resin member, whereby the easily peelable absorption film can be peeled off so as for the absorption layer to be not exposed even after peeling off.

The cohesive peeling in the easy peel layer can be achieved, for example, by making the tensile fracture strength of the absorbing layer equal to or higher than that of the easy peel layer according to JIS K 7127:1999, and/or by increasing the interlayer strength between the absorption layer and the easy peel layer, and/or by making the thermoplastic resin constituting the easy peel layer a sea island structure, or the like.

The tensile fracture strength may be measured by using a test piece having a thickness of 100 μm, a width of 15 mm and a length of 70 mm, for example, and using a tensile tester under the conditions in which the distance between chucks is 50 mm and a tensile speed is 300 mm/min.

In the present invention, the "other resin member" may be, for example, other film, other package, or the like. Other films may be other absorption films or may be other non-absorption films.

Hereinafter, each component of the present invention will be described.

<Absorbent Layer>

The absorption layer contains a thermoplastic resin and an absorbing agent. The absorbing agent may be dispersed in a thermoplastic resin.

The content of the absorbing agent in the absorption layer is, based on the mass of the entire absorption layer, preferably 20 mass % or more, 25 mass % or more, or 30 mass % or more from the viewpoint of ensuring good absorption ability; and is preferably 70 mass % or less, 65 mass % or less, 60 mass % or less, 55 mass % or less, 50 mass % or less, 45 mass % or less, or 40 mass % or less from the viewpoint of ensuring good film formability.

The thickness of the absorption layer is preferably 1 μm or more, 2 μm or more, 3 μm or more, 5 μm or more, 10 μm or more, 20 μm or more, or 30 μm or more from the viewpoint of ensuring a good absorption capacity, and is preferably 100 μm or less, 90 μm or less, or 80 μm or less from the viewpoint of ensuring flexibility of the film.

(Thermoplastic Resin)

Thermoplastic resins include, for example, polyolefins, polyesters, polyvinyl chloride (PVC), ionomers, and derivatives thereof, and mixtures thereof.

Examples of the polyolefin include polyethylene-based resins and polypropylene-based resins, etc.

In the present description, a polyethylene-based resin is a resin containing more than 50 mol %, 60 mol % or more, 70 mol % or more, or 80 mol % or more of a repeating unit of an ethylene group in a main chain of a polymer, and for example, are selected from the group consisting of a polyethylene such as a low-density polyethylene (LDPE), a medium-density polyethylene (MDPE), a high-density polyethylene (HDPE), an ethylene-(meth)acrylate copolymer such as an ethylene-methacrylic acid copolymer (EMAA), an ethylene-ethylacrylate copolymer (EEA), an ethylene-methylacrylate copolymer (EMA) and derivatives thereof, and mixtures thereof.

In the present description, a polypropylene-based resin is a resin containing more than 50 mol %, 60 mol % or more, 70 mol % or more, or 80 mol % or more of a repeating unit of a propylene group in a main chain of a polymer, and examples thereof include polypropylene (PP) homopolymers, random polypropylene (random PP), block polypropylene (block PP), chlorinated polypropylene, acid-modified polypropylene, and derivatives thereof, and mixtures thereof.

Examples of the polyester include polyethylene terephthalate (PET), polybutylene terephthalate, and the like.

As the thermal characteristics of the thermoplastic resin in the absorption layer, for example, the melt mass flow rate (MFR) of the thermoplastic resin is, when measured in accordance with JIS K7210 under the conditions of 190° C. and a load of 21.18 N, preferably 10 g/10 min or more, 12 g/10 min or more, 15 g/10 min or more, 18 g/10 min or more, or 20 g/10 min or more, from the viewpoint of facilitating good dispersion of the absorbing agent in the thermoplastic resin due to the high fluidity of the thermoplastic resin. This MFR may be 100 g/10 min or less, 70 g/10 min or less, 50 g/10 min or less, or 30 g/10 min or less.

(Absorbing Agent)

As the absorbing agent, for example, a moisture absorbing agent and a gas absorbing agent can be used.

As the moisture absorbing agent, a physical moisture absorbing agent such as a hydrophilic zeolite or silica gel, a chemical moisture absorbing agent such as calcium oxide, magnesium sulfate, calcium chloride, or aluminum oxide can be used.

As the hydrophilic zeolite, for example, a zeolite of type A, type X, or type LSX can be used. These may be used alone or in combination.

As the gas absorbing agent, a physical gas absorbing agent such as activated carbon or hydrophobic zeolite, a chemical gas absorbing agent such as an iron-based oxygen absorber, a halogenated metal, an oxidized metal, a sulfate, a sulfite, a bisulfite, a nitrous acid salt, or the like can be used.

As the hydrophobic zeolite, for example, a zeolite of beta type, ZSM-5 type, ferrienite type, mordenite type, L type, or Y type can be used. It is also possible to use ZSM-11 which is analogs of ZSM-5 type zeolites, silicalite, silicalite-2, and pentasil-type metallosilicates. These may be used alone or in combination.

As the iron-based oxygen absorber, iron powder (e.g., reduced iron powder, sprayed iron powder, activated iron powder, or the like), ferrous oxide, ferrous salt, or the like can be used.

As the metal halide, for example, calcium chloride, sodium chloride, sodium bromide, sodium iodide, potassium chloride, potassium bromide, potassium iodide, calcium chloride, magnesium chloride, barium chloride, and the like can be used.

As the metal oxide, for example, calcium oxide, aluminum oxide, cerium oxide having an oxygen defect, titanium oxide having an oxygen defect, or the like can be used.

(Other Ingredients)

The absorption layer may contain other components within a range not impairing the action of the present invention. Examples of the other component include a metal soap for improving dispersibility and the like. As the metal soap, a salt of a fatty acid such as stearic acid, lauric acid, ricinoleic acid, or octylic acid with a metal such as lithium, magnesium, calcium, barium, or zinc can be used.

<Easy Peel Layer>

The easy peel layer is a layer which is heat sealed to other resin members and is cohesively peeled off when peeled from other resin members.

The easy peel layer may be composed of a thermoplastic resin composition having a sea-island structure, and preferably a resin constituting a sea portion of a sea-island structure in the thermoplastic resin composition, i.e. a resin occupying more than 50% by volume of the thermoplastic resin composition, is a resin having the same repeating unit as a thermoplastic resin in an absorption layer. For example, when the thermoplastic resin in the absorption layer is an ethylene-(meth)acrylic acid copolymer, the resin constituting the sea portion of the easy peel layer is preferably, for example, polyethylene.

The tensile fracture strength of the easy peel layer can be reduced by increasing the content of the resin constituting the island portion of the sea island structure, i.e. the content of the resin contained in the easy peel layer in an amount of less than 50% by volume.

In particular, if the easy peel layer has a sea-island structure, as the thermal properties of the easy-peel layer, for example, the MFR of the easy-peel layer, which is measured under the conditions of a temperature of 190° C. and a load of 21.18 N in accordance with JIS K7210, is preferably 1.0 g or more, 3.0 g/10 min or more, or 5.0 g/10 min or more, from the view point that the island components of the sea-island structure is well dispersed, thereby reducing the tensile fracture strength. This MFR may be 100 g/10 min or less, 70 g/10 min or less, 50 g/10 min or less, 30 g/10 min or less, or 20 g/10 min or less.

<Skin Layer>

The skin layer is a layer containing a resin for a skin layer and not containing an absorbing agent. The skin layer is a layer present on a surface of the absorption layer on the side of the easy peel layer for the purpose of preventing the absorbing agent contained in the absorption layer from falling off or the like. The skin layer may be further present on the surface of the absorption layer on the side of the substrate layer. Further, the skin layer may be fused to the absorption layer.

The skin layer may be made of a thermoplastic resin. As the thermoplastic resin, for example, a thermoplastic resin mentioned with respect to an absorption layer and an easy peel layer can be used.

The thickness of the skin layer can be 1 μm or more, 3 μm or more, 5 μm or more, or 7 μm or more, and can be 50 μm or less, 40 μm or less, 30 μm or less, 20 μm or less, or 15 μm or less. When a skin layer is present on both sides of the absorption layer, the thickness of these skin layers may be the same or different.

As the thermal characteristics of the thermoplastic resins of the skin layers, for example, the melt flow rate thereof measured in accordance with JIS K7210 under the condition of a temperature of 190° C. and a load of 21.18 N is preferably, 0.1 g/10 min or more, 0.5 g/10 min or more, 1.0 g/10 min or more, 3.0 g/10 min or more, or 5.0 g/10 min or more, and 100 g/10 min or less, 50 g/10 min or less, 30 g/10 min or less, or 20 g/10 min or less.

<<Packaging Laminates>>

Figure 2:
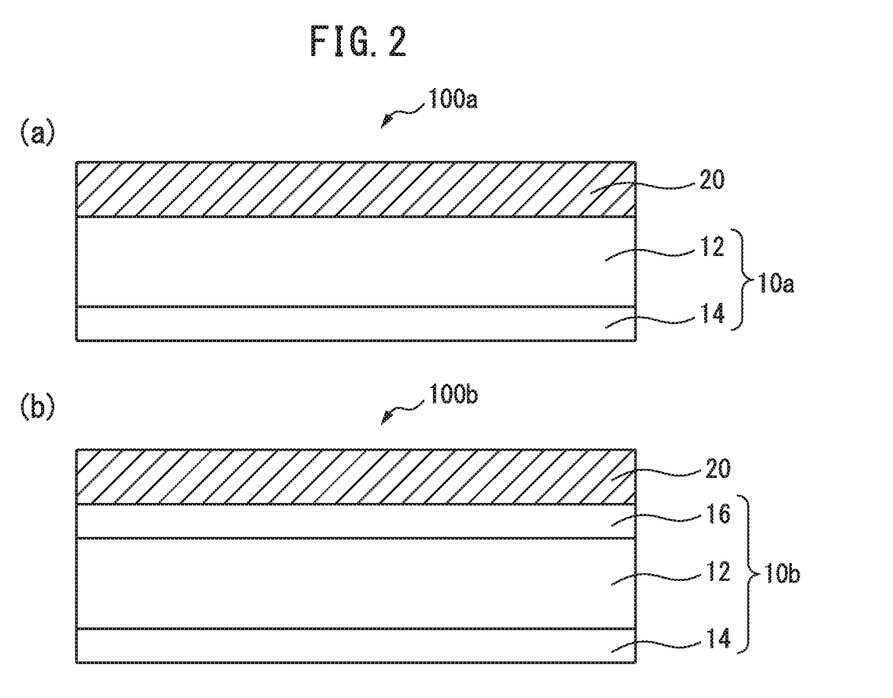
FIG. 2 is a schematic cross-sectional view of the packaging laminate of the present invention.

As shown in FIGS. 2 (a) and (b), the packaging laminates 100a, 100b comprise an easily peelable absorption films 10a, 10b, and a substrate layer 20 that is laminated on the surface opposite to the easy peel layer 14 of the easily peelable absorption films 10a, 10b.

<Substrate Layer>

The substrate layer may be composed of only a barrier layer or only a resin layer, or may be composed of a barrier layer and a resin layer.

(Barrier Layer)

As the barrier layer, a material capable of suppressing moisture, an organic gas and an inorganic gas from the outside from permeating into the absorption layer can be used. As the barrier layer, for example, but not limited to, a metal foil such as an aluminum foil or an aluminum alloy foil, an inorganic vapor deposition film such as an aluminum vapor deposition film, a silica vapor deposition film, an alumina vapor deposition film, or a silica-alumina binary vapor deposition film, or an organic coating film such as a polyvinylidene chloride coating film or a polyvinylidene fluoride coating film can be used. In particular, it is preferable to use an aluminum foil as the barrier layer from the viewpoint of making it easier to achieve both the barrier property and the handling property as the packaging laminate.

The thickness of the barrier layer is preferably 7 μm or more, 10 μm or more, or 15 μm or more from the viewpoint of achieving strength and barrier properties, and preferably 45 μm or less, 40 μm or less, or 35 μm or less from the viewpoint of improving handling properties as a packaging laminate.

(Resin Layer)

As the resin layer, a thermoplastic resin excellent in impact resistance, abrasion resistance, and the like, for example, a polyolefin, a α-olefin-(meth)acrylic acid copolymer, a vinyl-based polymer, a polyester, a polyamide, or the like can be used alone or in combination of 2 or more thereof in a multiple layer. This resin layer may be a stretched film or a non-stretched film. By this resin layer, the barrier layer can be protected.

Examples of the vinyl-based polymer include polyvinyl chloride (PVC), polyvinylidene chloride (PVDC), polychlorotrifluoroethylene, polytetrafluoroethylene, and polyacrylonitrile (PAN), and the like.

Examples of the polyamide include nylon (registered trademark) such as nylon 6 and nylon MXD6

The thickness of the resin layer is preferably 7 μm or more, 10 μm or more, or 15 μm or more from the viewpoint of satisfactorily protecting the barrier layer, and preferably 55 μm or less, 50 μm or less, or 45 μm or less from the viewpoint of improving the handling property as the packaging laminate.

<Other Layers>

The packaging laminate of the present invention may comprise another layer, e.g., an adhesive layer, between each layer. As the adhesive layer, for example, a dry laminate adhesive, a hot melt adhesive, a water-soluble adhesive, an emulsion adhesive, and a thermoplastic resin for extrusion lamination, and the like can be used.

<<Packaging Bag>>

The packaging bag of the present invention comprises one or a plurality of the above-mentioned packaging laminates, and a portion of the easy peel layer side of the one or more packaging laminate is heat-sealed with other portions of the packaging laminate or a film so as to form a bag shape. The film may be another packaging laminate, or may be a film other than the packaging laminate.

Examples of the form of the packaging bag include a three-way seal bag, a four-way seal bag, a gusset bag, a bottom gusset bag, a stand bag, a bottom seal bag, a tetrahedral bag, and the like.

The packaging bag of the present invention may be a packaging bag with contents, containing contents.

<Contents>

The contents are not limited as long as it can be deteriorated by contact with outside air, and may be, for example, an agent, a food, a cosmetic, a medical instrument, a medical device, an electronic component, a precision machine, a recording material, or the like. Further, the agent includes, in addition to the pharmaceutical preparation, a cleaning agent, an agricultural chemical, and the like.

<<Process for Producing Easily Peelable Absorption Film>>

The easily peelable absorption film of the present invention can be produced by a method comprising producing a resin composition for an absorption layer, producing a resin composition for an easy peel layer, forming a film, and a lamination. The method may further comprise making a resin composition for an optional skin layer.

Preparation of the resin composition for an absorption layer can be performed by kneading the above-described absorption layer and thermoplastic resin. Further, the preparation of the resin composition for the easy peel layer and the resin composition for the skin layer can be performed by kneading the thermoplastic resin constituting the easy peel layer and the skin layer, respectively.

For kneading, for example, a batch type kneader such as a kneader, a mixing roll, or a conical mixer, a continuous kneader such as a twin-screw kneader, a single-screw extruder, a two-roll kneader, a three-roll kneader, or the like is used. In this case, the kneading can be performed at a temperature of 80° C. or more, 100° C. or more, 120° C. or more, or 140° C. or more, and 220° C. or less, 200° C. or less, or 180° C. or less, depending on the material used.

The above-mentioned kneaded resin compositions for the absorption layer, easy peel layer, and optional skin layer can be formed into an absorption layer, an easy peel layer, and an optional skin layer, respectively, and these can be laminated together to obtain an absorption film of the present invention. The film forming step may be carried out by making the above kneaded resin composition for an absorption layer, easy peel layer, and optional skin layer into single-layer films respectively with extrusion molding such as an inflation method, a T die method, a cast method, so that the film forming step and the lamination step of the absorption layer and easy peel layer may be carried out exclusively. Otherwise the film forming step and lamination step may be carried out simultaneously by a co-extrusion method such as a multilayer inflation method or a multilayer T-die method, or the like.

In particular, from the viewpoint of directly laminating the easy peel layer on the absorption layer, it is preferable to simultaneously perform the film forming step and the laminating step of the absorption layer and the easy peel layer by a co-extrusion method such as a multilayer inflation method or a multilayer T-die method.

EXAMPLES

The present invention will be specifically described by way of Examples and Comparative Examples, but the present invention is not limited thereto.

Preparation of Packaging Laminates

Example 1

An absorption film three kinds and three layers was produced by multilayer extrusion in a multilayer T-die film forming machine (KZW15TW-45MG-NH-2200, Technobel Co., Ltd.) so that a skin layer, an absorption layer, and an outermost surface layer were arranged in this order. As the skin layer, linear low-density polyethylene (Evolue SP2520, Prime Polymer Co., Ltd.) was used. As the absorption layer, a resin composition prepared by melt-kneading a hydrophilic zeolite (molecular sieve 3A, Union Showa Co., Ltd.) and an ethylene-methacrylic acid copolymer (Nucrel AN42115C, Mitsui DuPont Polychemical Co., Ltd.) at a mass ratio of 53:47 was used, and as the outermost layer, an easy-peel (EP) resin A (Hirodain 7000EXP41001, Yasuhara Chemical Co., Ltd.) containing polyethylene as a main component was used. The thickness of each layer was set to 10 μm of skin layer, 60 μm of absorption layer, and 20 μm of easy peel layer.

Then, on the skin layer side of the produced absorption film, PET (12 μm)//the aluminum foil (9 μm) laminate as a substrate layer is laminated by using a dry laminate adhesive (takerack A-525S/takenate A-50, Mitsui Chemicals Co., Ltd.) to produce a packaging laminate of Example 1.

Examples 2-8 and Comparative Examples 1-5

A packaging laminates of Examples 2 to 8 and Comparative Examples 1 to 5 were prepared in the same manner as in Example 1, except that the contents of the absorbent and the ethylene-methacrylic acid copolymer of the absorption layer, and the kind of the resin of the outermost layer were changed as shown in Table 1. In Table 1, the homopolypropylene (PP) is PC600A (San Alomer Co., Ltd.), and the EP resin B is an EP resin (Hirodyne 7000EXP40301, Yasuhara Chemical Co., Ltd.) having less polyethylene components than the EP resin A <Measurement of Tensile Fracture Strength>

Separately from the above-mentioned packaging laminate, single-layer films A to I having a thickness of 100 μm were prepared for evaluating the tensile fracture strength by hot pressing using the above-mentioned materials under the conditions of a temperature of 170° C., a pressure of 50 MPa, and a press time of 2 minutes.

Each prepared film was cut into rectangles having width of 15 mm and length of 70 mm, and then, using a tensile testing machine, the tensile fracture strengths of this cut film was measured under the conditions of the distance between chucks of 50 mm and tensile speed of 300 mm/min.

The results are given in Table 1.

TABLE 1

| Sample | Tensile fracture strength (N) |
|---|---|
| EP resin A (high-quantity PE) | 13.8 |
| EP resin B (low-quantity PE) | 10.6 |
| Zeolite 3A (10) + EMAA (90) | 19.0 |
| Zeolite 3A (20) + EMAA (80) | 18.4 |
| Zeolite 3A (30) + EMAA (70) | 18.2 |
| Zeolite 3A (40) + EMAA (60) | 16.9 |
| Zeolite 3A (53) + EMAA (47) | 14.7 |
| Zeolite 3A (57) + EMAA (43) | 8.5 |
| LLDPE | 24.6 |
| Homo PP | 53.0 |

From Table 1, it can be understood that the tensile fracture strength of the EP resin decreases as the content of polyethylene, which is the main component, decreases, that is, as the content of the component in the island portion of the sea island structure increases.

In addition, it will be understood that, when the content of the zeolite 3A increases in the resin composition constituting the absorption layer, i.e. in a composition of the zeolite 3A and EMAA, then the tensile fracture strength decreases, and when the content of the zeolite 3A becomes the high content range, then the degree of reduction in the tensile fracture strength increases.

<<Peel Test>>

Each outermost layer of the produced packaging laminate was heat-sealed onto a low-density polyethylene (LDPE) film at 140° C. for 1 second at 0.2 MPa.

Then, the heat-sealed packaging laminate and LDPE film is cut out to 15 mm wide, and then a tensile testing machine is used such that the packaging laminate was T-peeled off from LDPE film at a tensile speed of 300 mm/min. The state of the peeled portion was observed with a microscope to specify the peeled portion. In the "Peeled portion" in Table 2 below, those describing a name of layer are indicative of cohesive peeling at that layer, and those describing an "interface" are indicative of peeling at the interface between the absorption layer and the outermost layer.

<<Moisture Absorption Test>>

First, a nonwoven fabric immersed with water was laid in a bottle and the bottle having the nonwoven fabric is placed in an oven at 60° C., thereby preparing a hot and humid environment. Each produced packaging laminate was then cut into 10 cm squares to measure the mass, and placed in this bottle, which was then stored in an oven at 60° C. for 14 hours.

After storage, samples were removed to wipe off surface moisture, allowed to stand for 3 hours in an environment of 23° C. and relative humidity 50% RH, and the mass of the each samples was measured. The mass difference before and after moisture absorption was calculated to determine a saturated moisture absorption amount.

Table 2 shows the results. In the "tensile fracture strength" of the moisture absorption layer in Table 2, a value in the form of a range does not indicate actually measured value, but is a range of tensile fracture strength estimated based on the relationship between the measured result of tensile fracture strength and the content of the absorbent shown in Table 1.

TABLE 2

| | Configuration | | | | | | | |
|---|---|---|---|---|---|---|---|---|
| | Skin layer | | Absorption layer | | | | Outermost layer | |
| | | | Absorbing agent | | Thermoplastic resin | | | |
| | Type | Content (mass %) | Type | Content (mass %) | Type | Content (mass %) | Type | Content (mass %) |
| Comp Ex. 1 | LLDPE | 100 | Zeolite 3A | 50 | EMAA | 50 | LLDPE | 100 |
| Comp Ex.2 | LLDPE | 100 | Zeolite3A | 50 | EMAA | 50 | Homo PP | 100 |
| Comp | LLDPE | 100 | Zeolite3A | 57 | EMAA | 43 | EP resin A | 100 |

TABLE 2-continued

Table 2

| | | | | | | | | |
|---|---|---|---|---|---|---|---|---|
| Ex.3 Comp Ex.4 | LLDPE | 100 | Zeolite3A | 57 | EMAA | 43 | EP resin B | 100 |
| Ex.1 | LLDPE | 100 | Zeolite3A | 53 | EMAA | 47 | EP resin A | 100 |
| Ex.2 | LLDPE | 100 | Zeolite3A | 53 | EMAA | 47 | EP resin B | 100 |
| Ex.3 | LLDPE | 100 | Zeolite3A | 49 | EMAA | 51 | EP resin A | 100 |
| Ex.4 | LLDPE | 100 | Zeolite3A | 45 | EMAA | 55 | EP resin A | 100 |
| Ex.5 | LLDPE | 100 | Zeolite3A | 23 | EMAA | 77 | EP resin A | 100 |
| Ex.6 | LLDPE | 100 | Zeolite3A | 23 | EMAA | 77 | EP resin B | 100 |
| Ex.7 | LLDPE | 100 | Zeolite3A | 22 | EMAA | 78 | EP resin A | 100 |
| Ex. 8 | LLDPE | 100 | Zeolite3A | 22 | EMAA | 78 | EP resin B | 100 |
| Comp Ex.5 | LLDPE | 100 | Zeolite3A | 10 | EMAA | 90 | EP resin A | 100 |

| | Evaluation | | | |
|---|---|---|---|---|
| | Tensile fracture strength (N) | | | Saturation |
| | Moisture absorption layer | Outermost layer (Easy peel layer) | Peeled portion | moisture absorption (g/m) |
| Comp Ex. 1 | 14.7~16.9 | 24.6 | Absorbent layer | 3.3 |
| Comp Ex.2 | 14.7~16.9 | 53.0 | Interface | 3.3 |
| Comp Ex.3 | 8.5 | 13.8 | Absorbent layer | 3.8 |
| Comp Ex.4 | 8.5 | 10.6 | Absorbent layer | 3.8 |
| Ex.1 | 14.7 | 13.8 | Outermost layer | 3.5 |
| Ex.2 | 14.7 | 10.6 | Outermost layer | 3.5 |
| Ex.3 | 14.7~16.9 | 13.8 | Outermost layer | 3.2 |
| Ex.4 | 14.7~16.9 | 13.8 | Outermost layer | 3.0 |
| Ex.5 | 18.2~18.4 | 13.8 | Outermost layer | 1.5 |
| Ex.6 | 18.2~18.4 | 10.6 | Outermost layer | 1.5 |
| Ex.7 | 18.2~18.4 | 13.8 | Outermost layer | 1.4 |
| Ex. 8 | 18.2~18.4 | 10.6 | Outermost layer | 1.4 |
| Comp Ex.5 | 19.0 | 13.8 | Outermost layer | 0.7 |

From Table 2, it is understood that the packaging laminates of Examples 1 to 8, in which the outermost layer was cohesively peeled, could be peeled off without exposing the zeolite. It is understood that this cohesive peeling is achieved when the tensile fracture strength of the absorption layer is greater than that of the outermost layer.

On the other hand, it is understood that, in the packaging laminate of Comparative Example 1, since the tensile fracture strength of the absorption layer was smaller than that of the outermost layer, the cohesive peeling was not obtained in the outermost layer, and fracture occurred in the absorption layer.

It is believed that, in the packaging laminate of Comparative Example 2, the thermoplastic resin constituting the outermost layer does not have a monomer common to the thermoplastic resin in the absorption layer, and as a result, peeling at an interface between the absorption layer and the outermost layer occurred. The peeling strength at the time of peeling was 1.6 N/15 mm.

It can be seen that the packaging laminates of Comparative Examples 3 and 4 exhibited fractures in the absorption layer since the tensile fracture strength of the absorption layer is less than that of the outermost layer. However, it can be inferred that, for example, if a layer having a lower tensile fracture strength such as a layer of a resin having a lower polyethylene component than the EP resin B described above is used as the outermost layer, cohesive peeling at outermost layer occurs in the same manner as in the examples.

In the packaging laminate of Comparative Example 5, as in the packaging laminates of Examples 1 to 8, the outermost surface layer was cohesively peeled off. However, it can be understood that the moisture absorption amount of the packaging laminate of Comparative Example 5 was significantly lower as compared with the moisture absorption amount of the packaging laminate of Examples 1 to 8 as a result of the content of the absorbent being 10 mass %.

REFERENCE SIGNS LIST 10a, 10b Easily peelable absorption film
12 Absorbent layer
14 Easy peel layer
16 Skin layer
20 Substrate layer
30 Other resin materials
100a, 100b Packaging laminate
200 Conventional packaging laminate

The invention claimed is:
1. A peelable absorption film, comprising:
an absorption layer containing a thermoplastic resin and an absorbing agent; and
a peel layer laminated directly to one side of the absorption layer,
wherein the content of the absorbing agent is 20 mass % or more based on the mass of the entire absorption layer, and wherein a peel layer side of the peelable absorption film is configured to be heat-sealed to an opposing resin member, wherein the peel layer side of the peelable absorption film is configured to be cohesively peeled off from the opposing resin member, and wherein the tensile fracture strength according to JIS K 7127:1999 of the absorption layer is greater than that of the peel layer.

2. The peelable absorption film as claimed in claim 1, wherein the thermoplastic resin in the absorption layer is an ethylene-(meth)acrylic acid copolymer.

3. The peelable absorption film as claimed in claim 1, wherein the absorbing agent is a moisture absorbing agent.

4. The peelable absorption film as claimed in claim 3, wherein the moisture absorbing agent is a zeolite.

5. The peelable absorption film as claimed in claim 1, further comprising a skin layer on a surface of the absorption layer opposite to the peel layer.

6. A packaging laminate comprising, an peelable absorption film as claimed in claim 1, and a substrate layer laminated on a surface of the peelable absorption film opposite to the peel layer.

7. A packaging bag, wherein the packaging bag comprises one or more packaging laminate as claimed in the claim 6, and wherein a portion of the peel layer side of the one or more packaging laminate is heat-sealed with other portions of the packaging laminate or a film other than the packaging laminate so as to form a bag shape.

8. A packaging bag with contents, comprising a content, and the packaging bag as claimed in claim 7, containing the contents.

9. The peelable absorption film as claimed in claim 1, wherein the content of the absorbing agent is 45% mass or less based on the mass of the entire absorption layer.

* * * * *

UNITED STATES PATENT AND TRADEMARK OFFICE
CERTIFICATE OF CORRECTION

PATENT NO. : 11,318,720 B2
APPLICATION NO. : 17/046136
DATED : May 3, 2022
INVENTOR(S) : K. Suzuki et al.

Page 1 of 1

It is certified that error appears in the above-identified patent and that said Letters Patent is hereby corrected as shown below:

In the Claims

Column 14, (Claim 6, Line 1) change "an peelable" to -- the peelable --

Column 14, (Claim 7, Line 3) change "in the claim" to -- in claim --

Signed and Sealed this
Sixth Day of December, 2022

Katherine Kelly Vidal
*Director of the United States Patent and Trademark Office*